US012693656B2

(12) United States Patent
Oonishi

(10) Patent No.: US 12,693,656 B2
(45) Date of Patent: Jul. 28, 2026

(54) NUMERICAL CONTROL DEVICE FOR CONTROLLING MACHINE TOOL USING ROTARY MULTI-EDGE TOOL

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 398 days.

(21) Appl. No.: 18/548,333

(22) PCT Filed: May 25, 2021

(86) PCT No.: PCT/JP2021/019748
§ 371 (c)(1),
(2) Date: Aug. 29, 2023

(87) PCT Pub. No.: WO2022/249272
PCT Pub. Date: Dec. 1, 2022

(65) Prior Publication Data
US 2024/0142947 A1 May 2, 2024

(51) Int. Cl.
*G05B 19/416* (2006.01)
*G05B 19/404* (2006.01)

(52) U.S. Cl.
CPC ....... *G05B 19/4163* (2013.01); *G05B 19/404* (2013.01); *G05B 19/4166* (2013.01)

(58) Field of Classification Search
CPC .............. G05B 19/4163; G05B 19/404; G05B 19/4166; G05B 19/19; B23Q 15/12
(Continued)

(56) References Cited

U.S. PATENT DOCUMENTS 10,671,046 B2 * 6/2020 Watanabe ............ G05B 19/402
2013/0309034 A1 * 11/2013 Inagaki .............. B23Q 11/0039
409/141
(Continued)

FOREIGN PATENT DOCUMENTS

| JP | 2004-223630 A | 8/2004 |
| JP | 2013-214231 A | 10/2013 |
| JP | 2013-240837 A | 12/2013 |

OTHER PUBLICATIONS

International Search Report issued in PCT/JP2021/019748; mailed Aug. 10, 2021.

*Primary Examiner* — Jigneshkumar C Patel
(74) *Attorney, Agent, or Firm* — Studebaker Brackett PLLC

(57) ABSTRACT

A numerical control device comprising: a tool data acquisition unit configured to acquire tool data of a rotary multi-edge tool; a machining information acquisition unit configured to acquire machining information including a feed direction, a feed speed, and a number of rotations for the rotary multi-edge tool to move with respect to a workpiece; an oscillation condition acquisition unit configured to acquire an oscillation condition for the rotary multi-edge tool; and a movement command calculation unit configured to calculate a movement command for the rotary multi-edge tool to perform a relative movement with respect to the workpiece, the relative movement being coincident with a composite motion resulting from superposition of a basic movement in the feed direction at the feed speed and an oscillation determined based on the tool data, the number of rotations, and the oscillation condition.

7 Claims, 5 Drawing Sheets

(58) Field of Classification Search
USPC ........................................................ 700/188
See application file for complete search history.

(56) References Cited

U.S. PATENT DOCUMENTS

2018/0297163  A1*  10/2018  Sonoda  .............. B23Q 15/0075
2019/0310600  A1*  10/2019  Yamamoto  ........... G05B 19/182
2019/0310602  A1*  10/2019  Yamamoto  ........... G05B 19/186

* cited by examiner

Figure 1:
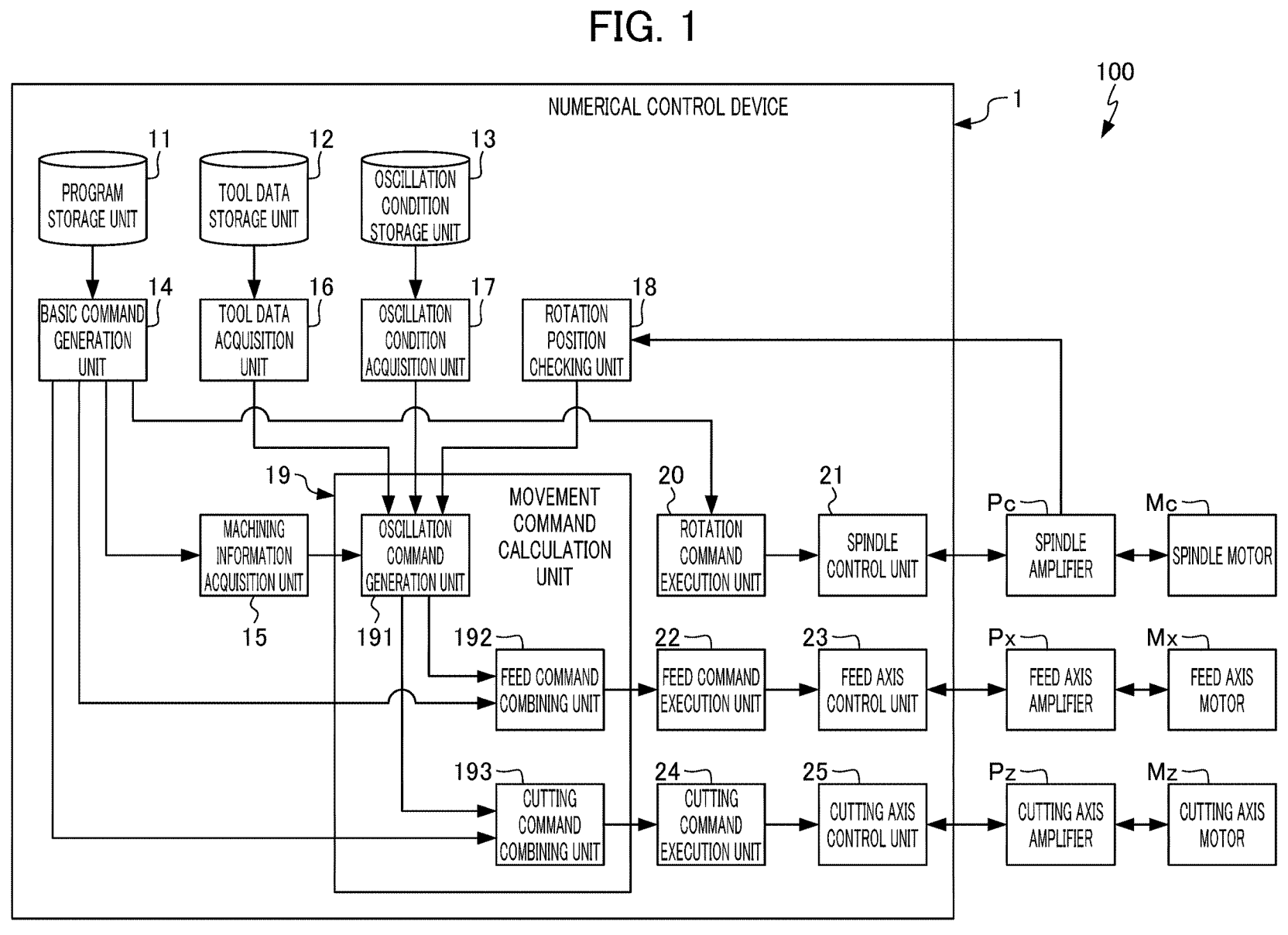

NUMERICAL CONTROL DEVICE

11 — PROGRAM STORAGE UNIT

12 — TOOL DATA STORAGE UNIT

13 — OSCILLATION CONDITION STORAGE UNIT

14 — BASIC COMMAND GENERATION UNIT

15 — MACHINING INFORMATION ACQUISITION UNIT

16 — TOOL DATA ACQUISITION UNIT

17 — OSCILLATION CONDITION ACQUISITION UNIT

18 — ROTATION POSITION CHECKING UNIT

19 — MOVEMENT COMMAND CALCULATION UNIT

191 — OSCILLATION COMMAND GENERATION UNIT

192 — FEED COMMAND COMBINING UNIT

193 — CUTTING COMMAND COMBINING UNIT

20 — ROTATION COMMAND EXECUTION UNIT

21 — SPINDLE CONTROL UNIT

22 — FEED COMMAND EXECUTION UNIT

23 — FEED AXIS CONTROL UNIT

24 — CUTTING COMMAND EXECUTION UNIT

25 — CUTTING AXIS CONTROL UNIT

Pc — SPINDLE AMPLIFIER

Px — FEED AXIS AMPLIFIER

Pz — CUTTING AXIS AMPLIFIER

Mc — SPINDLE MOTOR

Mx — FEED AXIS MOTOR

Mz — CUTTING AXIS MOTOR

NUMERICAL CONTROL DEVICE FOR CONTROLLING MACHINE TOOL USING ROTARY MULTI-EDGE TOOL

TECHNICAL FIELD

The present invention relates to a numerical control device and a machining method.

BACKGROUND ART

Milling is performed using a rotary multi-edge tool having a plurality of cutting edges (tips) on its circular periphery. For such milling, it has been proposed to perform multi-stage machining from rough cutting to finish cutting in one machining process by using a tool having tips arranged with a slight displacement in the radial direction and the axial direction of the rotary multi-edge tool (see, for example, Patent Document 1).

Patent Document 1: Japanese Unexamined Patent Application, Publication No. 2004-223630

DISCLOSURE OF THE INVENTION

Problems to be Solved by the Invention

As described in Patent Document 1, in order to use such displaced tips, it is necessary to fabricate a dedicated rotary multi-edge tool. Furthermore, the adjustment of the relative positions of the tips of such a rotary multi-edge tool is extremely complicated work. Therefore, in order to simplify and accelerate the machining in a wider range, it is desirable that multi-stage machining be able to be performed at once without depending on the arrangement of the cutting edges of the rotary multi-edge tool.

Means for Solving the Problems

An aspect of the present disclosure is directed to a numerical control device for controlling a machine tool based on a machining program, the machine tool being configured to machine a workpiece using a rotary multi-edge tool having a plurality of cutting edges. The numerical control device includes: a tool data acquisition unit configured to acquire tool data including a number of the cutting edges of the rotary multi-edge tool; a machining information acquisition unit configured to acquire machining information including a feed direction, a feed speed, and a number of rotations for the rotary multi-edge tool to move with respect to the workpiece in accordance with the machining program; an oscillation condition acquisition unit configured to acquire an oscillation condition for the rotary multi-edge tool to oscillate in at least one of the feed direction or a direction orthogonal to the feed direction; and a movement command calculation unit configured to calculate a movement command for the rotary multi-edge tool to perform a relative movement with respect to the workpiece, the relative movement being coincident with a composite motion resulting from superposition of a basic movement in the feed direction at the feed speed and an oscillation determined based on the tool data, the number of rotations, and the oscillation condition.

Another aspect of the present disclosure is directed to a method for machining a workpiece using a rotary multi-edge tool having a plurality of cutting edges. The method includes: acquiring tool data regarding the rotary multi-edge tool; acquiring machining information including a feed direction, a feed speed, and a number of rotations for the rotary multi-edge tool to move with respect to the workpiece; acquiring an oscillation condition for the rotary multi-edge tool to oscillate in at least one of the feed direction or a direction orthogonal to the feed direction; calculating a composite motion by superposing a basic movement in the feed direction at the feed speed and an oscillation determined based on the tool data, the number of rotations, and the oscillation condition; and causing the rotary multi-edge tool to perform a relative movement with respect to the workpiece, the relative movement being coincident with the composite motion.

Effects of the Invention

The numerical control device and the machining method according to the present disclosure make it possible to perform multi-stage machining at once without depending on the arrangement of cutting edges of a rotary multi-edge tool.

BRIEF DESCRIPTION OF THE DRAWINGS

FIG. 1 is a block diagram illustrating a configuration of a machine tool including a numerical control device according to an embodiment of the present disclosure;

PREFERRED MODE FOR CARRYING OUT THE INVENTION

Figure 2:
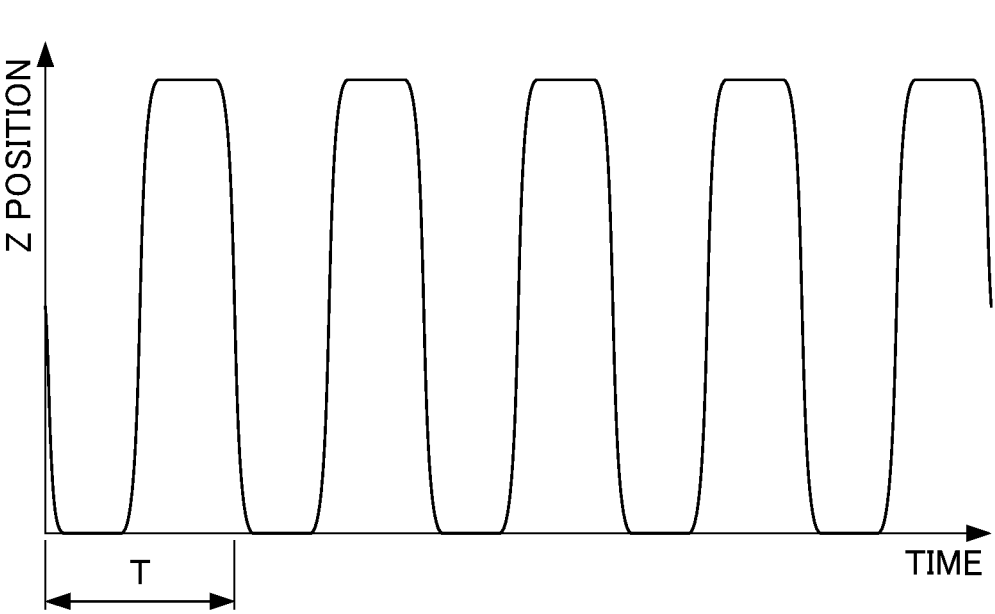
FIG. 2 is a graph illustrating an oscillation waveform in a rotation axis direction of a rotary multi-edge tool controlled by the numerical control device of FIG. 1.

Embodiments of the present disclosure will be described below with reference to the drawings. FIG. 1 is a block diagram illustrating a configuration of a machine tool 100 including a numerical control device 1 according to an embodiment of the present disclosure.

The machine tool 100 machines a workpiece (not shown) using a rotary multi-edge tool (not shown), a representative example of which is a milling tool having a plurality of cutting blades. The machine tool 100 includes a spindle that rotates the rotary multi-edge tool, one or more feed axes that move the rotary multi-edge tool relative to the workpiece in a radial direction of the rotary multi-edge tool (or the workpiece may be moved), and a cutting axis that protrudes and retracts the rotary multi-edge tool in its rotation axis direction. In the following description, the feed axis will be described as a single drive axis, but a plurality of drive axes may be cooperatively operated to cause the rotary multi-edge tool to perform a relative movement. The machine tool 100 may be capable of changing an orientation of the rotary multi-edge tool. In this case, the feed axis and the cutting axis may be realized by cooperative operation of a plurality of drive axes.

The machine tool 100 may include: a spindle motor Mc for driving the spindle; a feed axis motor Mx for driving the feed axis; a cutting axis motor Mz for driving the cutting axis; a spindle amplifier Pc for supplying power to the spindle motor Mc; a feed axis amplifier Px for supplying power to the feed axis motor Mx; a cutting axis amplifier Pz for supplying power to the cutting axis motor Mz; and the numerical control device 1 for controlling the spindle amplifier Pc, the feed axis amplifier Px, and the cutting axis amplifier Pz.

The numerical control device 1 controls the operation of the machine tool based on a machining program. The numerical control device 1 executes one embodiment of a machining method according to the present disclosure. The numerical control device 1 can be implemented by causing a computer device having a memory, a CPU (processor), an input/output interface, and the like to execute an appropriate control program.

The numerical control device 1 includes a program storage unit 11, a tool data storage unit 12, an oscillation condition storage unit 13, a basic command generation unit 14, a machining information acquisition unit 15, a tool data acquisition unit 16, an oscillation condition acquisition unit 17, a rotation position checking unit 18, a movement command calculation unit 19, a rotation command execution unit 20, a spindle control unit 21, a feed command execution unit 22, a feed axis control unit 23, a cutting command execution unit 24, and a cutting axis control unit 25. These components are defined by classifying the functions of the numerical control device 1, and do not have to be clearly distinguishable from each other in terms of physical configuration and program configuration.

The program storage unit 11 stores a machining program that specifies a machining procedure in a language such as the G code. In the machining program, information necessary for machining the workpiece into a desired shape is written in accordance with a predetermined rule, and the information includes, for example, a path and a speed (a feed direction and a feed speed) for the rotary multi-edge tool to perform a relative movement with respect to the workpiece, and the number of rotations of the rotary multi-edge tool. The program storage unit 11 has a function of securing a part of a storage area of a memory of a computer device and managing writing and reading of information in and from the storage area.

The tool data storage unit 12 stores tool data including information regarding the number of edges (the number of cutting edges), the diameter, etc. of the rotary multi-edge tool. Similarly to the program storage unit 11, the tool data storage unit 12 has a function of securing a part of the storage area of the memory of the computer device and managing writing and reading of information in and from the storage area.

The oscillation condition storage unit 13 stores an oscillation condition for the rotary multi-edge tool to oscillate in at least one of the feed direction or a direction orthogonal to the feed direction, preferably, in two directions, namely, the feed direction and a direction orthogonal to the feed direction, and more preferably, in the two directions in the same cycle. The oscillation condition constitutes information necessary for determining a cycle, a waveform, an amplitude, and a phase of an oscillation in accordance with the shape, the feed speed, the number of rotations, and the like of the rotary multi-edge tool. Specifically, the oscillation condition may include a function, a reference table, basic waveform information, and the like. The oscillation condition storage unit 13 may store a plurality of oscillation conditions, such as an accuracy-oriented condition and a speed-oriented condition, that lead to different oscillations even if the feed speed and the like are the same. Similarly to the program storage unit 11 and the tool data storage unit 12, the oscillation condition storage unit 13 has a function of securing a part of the storage area of the memory of the computer device and managing writing and reading of information in and from the storage area.

The basic command generation unit 14 generates a basic command that can cause the axes of the machine tool to perform a basic movement necessary for machining the workpiece based on the machining program. In other words, the basic command generation unit 14 generates, according to the machining program, a rotation command that specifies a position or a speed at each clock time for the spindle, a feed command that specifies a position or a speed at each clock time for the feed axis, and a cutting command that specifies a position or a speed at each clock time for the cutting axis. For example, in the case of machining an end face using a milling tool, the value of the cutting command of the basic command changes before a start of the cutting and remains unchanged during the cutting. Since the commands for the axes to perform the basic movement according to the machining program are generated in the same manner as in the conventional numerical control devices, a detailed description is omitted herein.

The machining information acquisition unit 15 acquires, from the basic command generation unit 14, machining information including a feed direction, a feed speed, and the number of rotations for the rotary multi-edge tool to move with respect to the workpiece in accordance with the machining program.

The tool data acquisition unit 16 acquires tool data regarding the rotary multi-edge tool from the tool data storage unit 12.

The oscillation condition acquisition unit 17 acquires, from the oscillation condition storage unit 13, the oscillation condition for oscillating the rotary multi-edge tool.

The rotation position checking unit 18 checks a rotation position of the rotary multi-edge tool (a rotational phase of the rotary multi-edge tool). The rotation position checking unit 18 of the present embodiment checks a rotation position of a milling tool based on a feedback value imputed from the spindle motor via the spindle amplifier. The rotation position checking unit 18 may check a rotation position of the rotary multi-edge tool based on a signal from the rotation command execution unit.

The movement command calculation unit 19 calculates a movement command for the rotary multi-edge tool to perform a relative movement with respect to the workpiece such that the relative movement is coincident with a composite motion resulting from superposition of a basic movement in a feed direction at a feed speed and an oscillation determined based on the tool data, the number of rotations, and the oscillation condition.

The movement command calculation unit 19 may include an oscillation command generation unit 191 that generates an oscillation command capable of causing an oscillation, a feed command combining unit 192 that adds a feed axis component of the oscillation command to a feed axis component of the basic command generated by the basic command generation unit 14, and a cutting command combining unit 193 that adds a cutting axis component of the oscillation command to a cutting axis component of the basic command.

The oscillation determined by the oscillation command generation unit 191 cyclical causes the rotary multi-edge tool to move in the feed direction and a direction orthogonal to the feed direction in a synchronized manner. That is, the oscillation cyclically displaces, in the two directions, a position through which the plurality of cutting edge of the rotary multi-edge tool pass. As a result, the rotary multi-edge tool is allowed to cut away a portion of the workpiece in one pass more deeply and more widely in comparison with a depth in the rotation axis direction and a width in a radial direction (direction orthogonal to the feed direction) up to which the workpiece can be cut away in the case of performing the basic movement simply in the feed direction. That is, oscillating the rotary multi-edge tool makes it possible to remove a larger volume of material from the workpiece in one pass. In particular, determining the oscillation such that the rotary multi-edge tool oscillates in two directions, i.e., the feed direction and the rotation axis direction makes it possible to achieve a substantial increase in the cutting amount.

The oscillation command generation unit 191 preferably determines the oscillation such that a protrusion amount of the rotary multi edge tool in the rotation axis direction is maximized at a position where a retraction amount of the rotary multi-edge tool in the feed direction reaches a maximum. Thus, the oscillation causes the rotary multi-edge tool to protrude to a forward position, where the rotary multi-edge tool removes a material in the vicinity of the surface of the workpiece. Thereafter, the oscillation causes the rotary multi-edge tool to retract to a backward position, where the rotary multi-edge tool cut away a deep portion of the workpiece. In other words, this oscillation enables multiple stages of machining, such as rough cutting and finish cutting, to be sequentially performed in one pass.

The number of the cutting edges that pass through the same rotation position in one cycle of the oscillation is defined as N. The oscillation command generation unit 191 preferably maintains the peak of the protrusion in the rotation axis direction at a maximum value for a period equal to or longer than 1/N of the one cycle during the oscillation. As a result, in a state where the rotary multi-edge tool protrudes most, the cutting edges each draw a continuous circular path, thereby making it possible to provide a smooth finish on the machined surface. In order to smoothen the machined surface, it is necessary to set one cycle of the oscillation to be equal to or less than a time until an amount of movement at the feed speed becomes equal to an effective length of the cutting edge in the radial direction.

The oscillation command generation unit 191 preferably determines the oscillation such that a specific one of the cutting edges is positioned at the forwardmost point in the feed direction at a predetermined phase of the oscillation. Specifically, the oscillation command generation unit 191 preferably defines the number of the cutting edges of the rotary multi-edge tool as N×M (in this case, N and M are positive integers), and sets the oscillation cycle to 1/M times the rotation cycle of the rotary multi-edge tool. As a result, only M cutting edges are used in finish cutting. Therefore, expensive tips need to be attached to only the cutting edges that are used to perform the finish cutting, thereby achieving both machining accuracy and economic efficiency.

The oscillation command generation unit 191 may be capable of selecting one cutting edge to be position at the forwardmost point in the feed direction at a predetermined phase of the oscillation, i.e., selecting the rotation position of the spindle. Thus, the plurality of cutting edges of the rotary multi-edge tool are each allotted rough cutting, medium cutting, finishing cutting, or the like in turn, thereby making it possible to equalize the load on the cutting edges and prolong the life of the rotary multi-edge tool.

The feed command combining unit 192 adds a component in the feed direction of the oscillation calculated by the oscillation command generation unit to a feed command of the basic movement generated by the basic command generation unit 14, and thereby calculates a feed command for realizing a feed motion component of a composite motion resulting from superposition of the oscillation on the basic movement. The feed command combining unit 192 may perform well-known processing such as interpolation of command values and acceleration/deceleration processing.

The cutting command combining unit 193 adds a component in the cutting direction (the rotation axis direction of the rotary multi-edge tool) of the oscillation calculated by the oscillation command generation unit to the cutting command of the basic movement generated by the basic command generation unit, and thereby calculates a feed command for realizing an oscillation component in the cutting direction of the composite motion. The cutting command combining unit 193 may also perform well-known processing such as interpolation of command values and acceleration/deceleration processing.

The rotation command execution unit 20 executes the rotation command generated by the basic command generation unit. Specifically, the rotation command execution unit 20 converts the rotation command that can be calculated in advance into a real-time signal, and inputs a current time value of the rotation command to a spindle control unit 21.

The spindle control unit 21 performs feedback control on the spindle amplifier Pc and hence the spindle motor Mc in accordance with the command value inputted from the rotation command execution unit 20.

The feed command execution unit 22 executes the feed command calculated by the feed command combining unit 192. Specifically, the feed command execution unit 22 inputs a current time value of the feed command to the feed axis control unit 23.

The feed axis control unit 23 performs feedback control on the feed axis amplifier Px and hence the feed axis motor Mx in accordance with the command value inputted from the feed command execution unit 22.

The cutting command execution unit 24 executes a cutting command calculated by the cutting command combining unit 193. Specifically, the cutting command execution unit 24 inputs a current time value of the cutting command to the cutting axis control unit 25.

The cutting axis control unit 25 performs feedback control on the cutting axis amplifier Pz and hence the cutting axis motor Mz in accordance with the command value inputted from the cutting command execution unit 24.

In order to facilitate understanding of cutting performed by the machine tool 100, the oscillation and effects thereof will be described with reference to a specific example. In the example described below, the number of cutting edges of a rotary multi-edge tool is 4, the tool radius is 60 mm, the number of rotations of the spindle is 600 rpm, the feed speed is 600 mm/min, and the rotary multi-edge tool is oscillated in the feed direction (X-axis direction) and the rotation axis direction (Z-axis direction) in a cycle T that is equal to one rotation of the rotary multi-edge tool.

Figure 3:
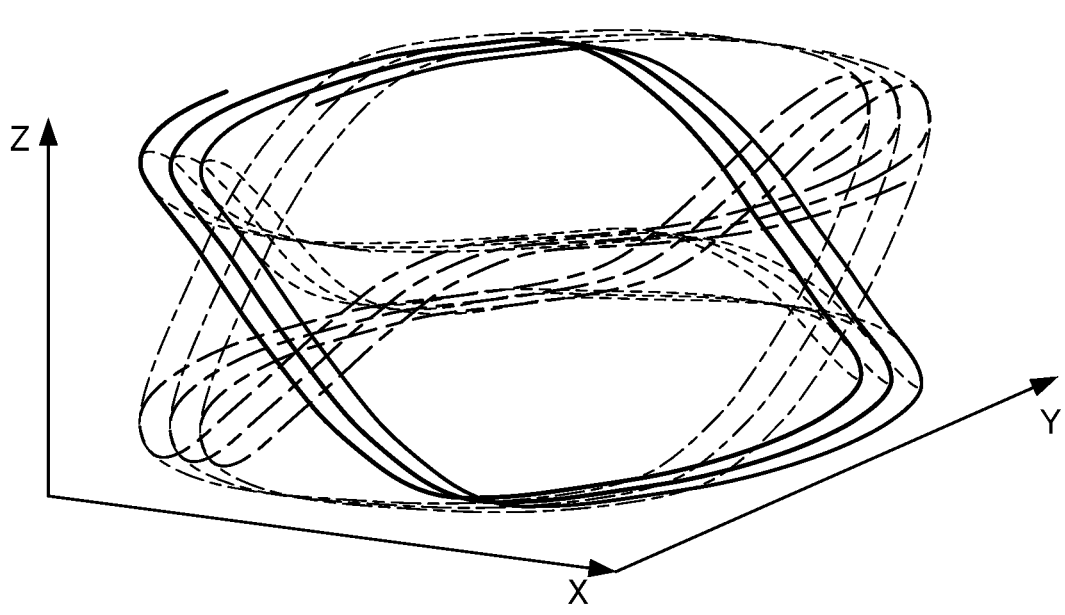
FIG. 3 is a diagram illustrating paths of cutting edges of the rotary multi-edge tool controlled by the numerical controller of FIG. 1.

The oscillation waveform in the feed direction is set to a sine wave having an amplitude of 0.4 mm. On the other hand, the oscillation waveform in the rotation axis direction is set to a waveform corresponding to a sine wave which has an amplitude of 0.03 mm and a cycle of 0.4 T, and the upper and lower peaks of which are each maintained for 0.3 T. FIG. 2 illustrates the oscillation waveform in the rotation axis direction. FIG. 3 illustrates paths of the cutting edges of the rotary multi-edge tool that rotates while performing a movement that is coincident with a composite motion. In FIG. 3, the paths are indicated by different types of lines.

Figure 4:
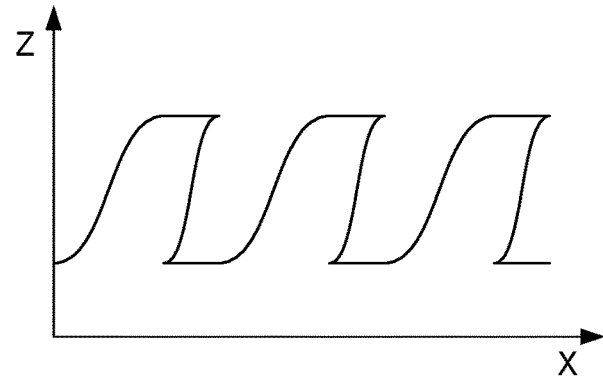
FIG. 4 is a diagram illustrating a movement waveform of a reference position of the rotary multi-edge tool controlled by the numerical control device of FIG. 1.

FIG. 4 illustrates a path of a reference point of the rotary multi-edge tool in the X-Z plane. As shown in the figure, the rotary multi-edge tool repeats a movement that is composed of a retrogression in the rotation axis direction in parallel with an advance in the feed direction (a decrease in the amount of cut) and protruding in the rotation axis direction in parallel with retrogression in the feed direction (an increase in the amount of cut).

Figure 5:
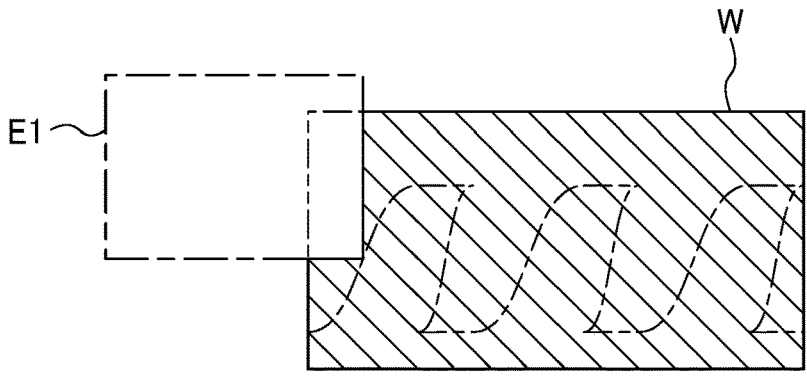
FIG. 5 is a schematic cross-sectional view of a workpiece and illustrates a stage of cutting performed by the numerical control device of FIG. 1.
Figure 6:
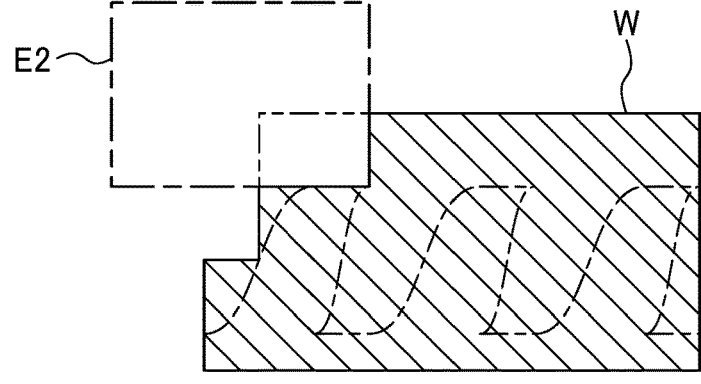
FIG. 6 is a schematic cross-sectional view of the workpiece and illustrates a stage following the stage illustrated in FIG. 5 of the cutting performed by the numerical control device of FIG. 1.
Figure 7:
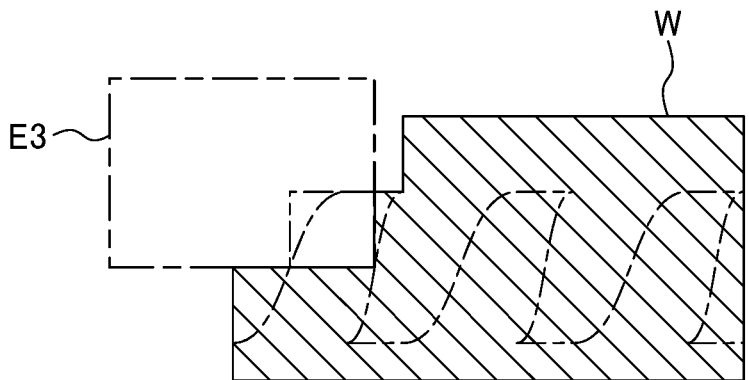
FIG. 7 is a schematic cross-sectional view of the workpiece and illustrates a stage following the stage illustrated in FIG. 6 of the cutting performed by the numerical control device of FIG. 1.
Figure 8:
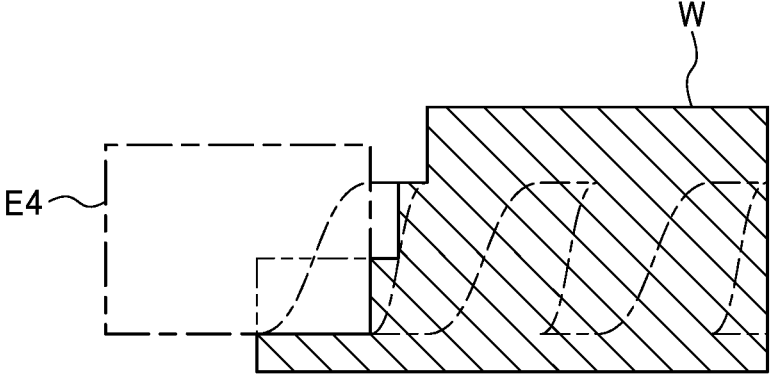
FIG. 8 is a schematic cross-sectional view of the workpiece and illustrates a stage following the stage illustrated in FIG. 7 of the cutting performed by the numerical control device of FIG. 1.

Furthermore, FIGS. 5 to 8 illustrate, in order, shapes of a workpiece W (cross-sectional shapes of the workpiece W in the X-Z plane including the rotation axis of the rotary multi-edge tool) after cutting by the cutting edges at the forwardmost point in the feeding direction of the rotary multi-edge tool. In this example, first, a first cutting edge E1, which is indicated by the broken line in FIG. 3, cuts away a portion of the workpiece W in a small range in the feed direction, up to a middle depth (FIG. 5). Thereafter, a second cutting edge E2, which is indicated by the one-dot chain line in FIG. 3, cuts away only a surface portion of the workpiece W in a larger range in the feed direction (FIG. 6). Subsequently, a third cutting edge E3, which is indicated by the two-dot chain line in FIG. 3, cuts away a portion of the workpiece W in a small range in the feed direction, up to a middle depth (FIG. 7). Finally, a fourth cutting edge E4, which is indicated by the solid line in FIG. 4, cuts away a portion of the workpiece W in a large range in the feed direction, up to a great depth (FIG. 8). As described above, since the plurality of cutting edges cut the workpiece W in a stepwise manner, the workpiece W can be cut to a depth greater than the heights of the cutting edges E1 to E4.

Figure 9:
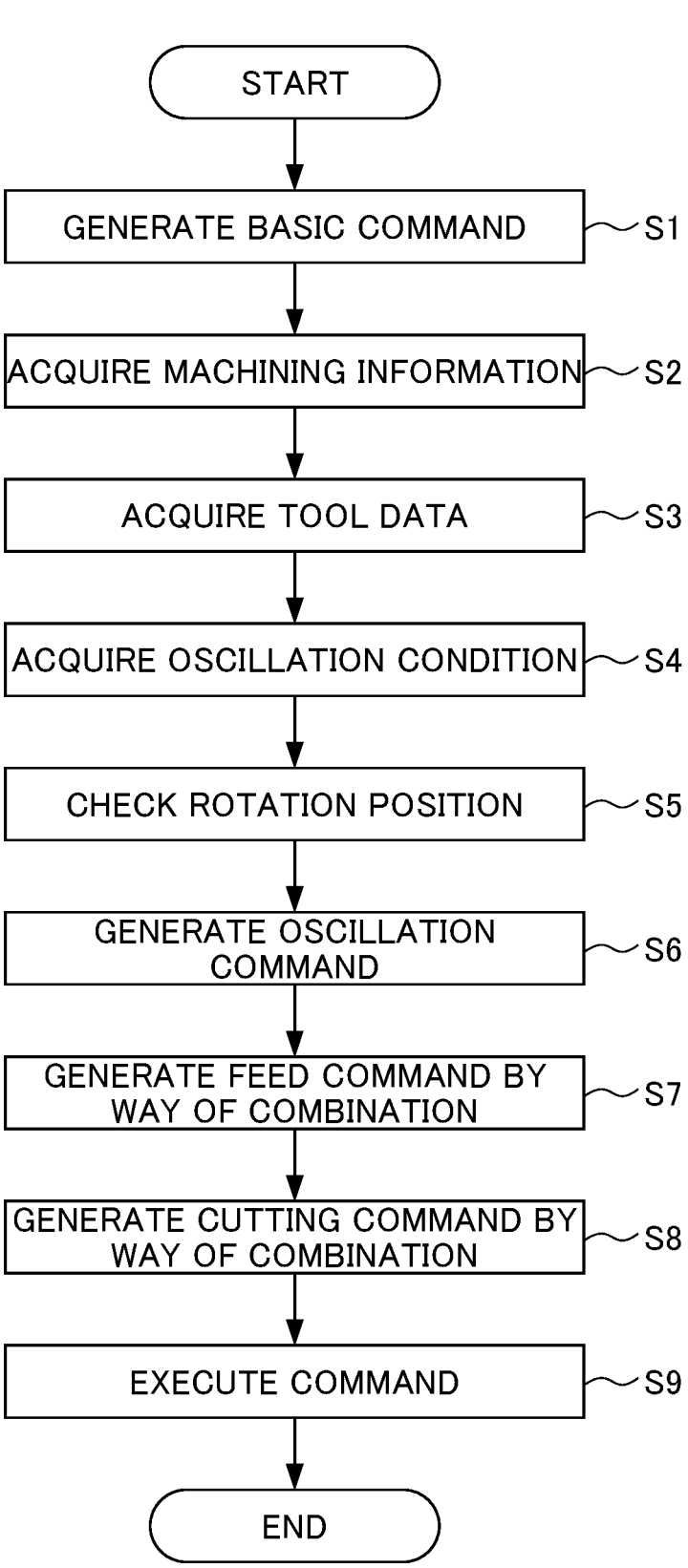
FIG. 9 is a flowchart illustrating a procedure of a machining method performed by the machine tool of FIG. 1.

As is apparent from the above description, one embodiment of a machining method according to the present disclosure is executable by the numerical control device 1 using the machine tool 100, and is a method for machining a workpiece using a rotary multi-edge tool having a plurality of cutting edges. As illustrated in FIG. 9, the machining method includes a basic command step (Step S1), a machining information acquisition step (Step S2), a tool data acquisition step (Step S3), an oscillation condition acquisition step (Step S4), a rotation position checking step (Step S5), an oscillation command generation step (Step S6), a feed command combining step (Step S7), a cutting command combining step (Step S8), and a command execution step (Step S9).

In the basic command step denoted as Step S1, the basic command generation unit 14 generates, based on a machining program, a basic command that specifies a basic movement for the rotary multi-edge tool to move relative to a workpiece in a feed direction at a feed speed.

In the machining information acquisition step denoted as Step S2, the may information acquisition unit 15 acquires, from the basic command generation unit 14, machining information including command values indicating the feed direction, the feed speed, and the number of rotations for the rotary multi-edge tool to move with respect to the workpiece.

In the tool data acquisition step denoted as Step S3, the tool data acquisition unit 16 acquires tool data from the tool data storage unit 12.

In the oscillation condition acquisition step denoted as Step S4, the oscillation condition acquisition unit 17 acquire an oscillation condition from the oscillation condition storage unit 13.

In the rotation position checking step denoted as Step S5, the rotation position checking unit 18 acquires information regarding a rotation position of the rotary multi-edge tool from the spindle ampler Pc (or the rotation command execution unit 20).

In the oscillation command generation step denoted by Step S6, the oscillation command generation unit 191 generates an oscillation command that can cause an oscillation determined based on the tool data, the number of rotations, and the oscillation condition.

In the feed command combining step denoted as Step S7, the feed command combining unit 192 adds a feed axis component of the oscillation command to a feed axis component of the basic command, and thereby generates a feed command for realizing a feed axis component of a composite motion resulting from superposition of the basic movement and the oscillation.

In the cutting command combining step denoted as Step S8, the cutting command combining unit 193 adds a cutting axis component of the oscillation command to a cutting axis component of the basic command, and thereby generates a cutting command for realizing a cutting axis component of the composite motion resulting from superposition of the basic movement and the oscillation. The oscillation command generation step, the feed command combining step, and the cutting command combining step together constitute a step of calculating a movement command.

In the command execution step denoted as Step S9, the rotation command execution unit 20 executes the rotation command, which is a spindle rotation component of the basic command generated by the basic command generation unit 14, the feed command execution unit 22 executes the feed command generated by the feed command combining unit 192, and the cutting command execution unit 24 executes the cutting command generated by the cutting command combining unit.

It should be noted that the embodiments described above are not intended to limit the present invention. The effects described in the above embodiments are merely the most favorable ones of the effects exerted by the present invention. The effects of the present invention are not limited to those described above.

The numerical control device according to the present disclosure may be devoid of the basic command generation unit that generates command values similar to the conventional ones, and the movement command calculation unit may generate, based on the tool data, the machining information, and the oscillation condition, a feed command, a cutting command, and a rotation command that cause the rotary multi-edge tool to perform a relative motion such that the relative motion is coincident with the composite motion resulting from superposition of the basic movement and the oscillation. In this case, the machining information acquisition unit acquires various parameters such as the feed speed and the like described in the machining program.

The numerical control device according to the present disclosure is also applicable to the case of using a rotary multi-edge tool having cutting edges arranged with a displacement for the purpose of cutting a workpiece deeper beyond the design range of the rotary multi-edge tool, for example.

Furthermore, in the numerical control device according to the present disclosure, the oscillation may include a component that oscillates the rotary multi-edge tool in a direction orthogonal to both the feed direction and the rotation axis direction of the rotary multi-edge tool (i.e., the Y direction in the above embodiment).

The machine tool controlled by the numerical control device according to the present disclosure may use a rotary multi-edge tool such as an end mill, in addition to the milling tool.

EXPLANATION OF REFERENCE NUMERALS

1: Numerical control device
100: Machine tool
11: Program storage unit
12: Tool data storage unit
13: Oscillation condition storage unit
14: Basic command generation unit
15: Machining information acquisition unit
16: Tool data acquisition unit
17: Oscillation condition acquisition unit
18: Rotation position checking unit
19: Movement command calculation unit
191: Oscillation command generation unit
192: Feed command combining unit
193: Cutting command combining unit
20: Rotation command execution unit
21: Spindle control unit
22: Feed command execution unit
23: Feed axis control unit
24: Cutting command execution unit
25: Cutting axis control unit

The invention claimed is:

1. A numerical control device for controlling a machine tool based on a machining program, the machine tool being configured to machine a workpiece using a rotary multi-edge tool having a plurality of cutting edges, the numerical control device comprising:
a processor configured to control the numerical control device to:
acquire tool data including a number of the cutting edges of the rotary multi-edge tool;
acquire machining information including a feed direction, a feed speed, and a number of rotations for the rotary multi-edge tool to move with respect to the workpiece in accordance with the machining program;
acquire an oscillation condition for the rotary multi-edge tool to oscillate in at least one of the feed direction or a direction orthogonal to the feed direction;
calculate a movement command for the rotary multi-edge tool to perform a relative movement with respect to the workpiece, the relative movement being coincident with a composite motion resulting from superposition of a basic movement in the feed direction at the feed speed and an oscillation determined based on the tool data, the number of rotations, and the oscillation condition; and control the multi-edge tool to perform the relative movement coincident with the composite motion based on the movement command to machine the workpiece,
wherein the oscillation causes the rotary multi-edge tool to oscillate in the feed direction and a direction orthogonal to the feed direction,
a number of the cutting edges that pass through an identical rotation position in one cycle of the oscillation is defined as N, and
the numerical control device maintains a peak of protrusion of the rotary multi-edge tool in a rotation axis direction at a maximum value for a period equal to or longer than 1/N of the one cycle during the oscillation.

2. A method for machining a workpiece using a rotary multi-edge tool having a plurality of cutting edges, the method comprising:
acquiring tool data regarding the rotary multi-edge tool;
acquiring machining information including a feed direction, a feed speed, and a number of rotations for the rotary multi-edge tool to move with respect to the workpiece;
acquiring an oscillation condition for the rotary multi-edge tool to oscillate in at least one of the feed direction or a direction orthogonal to the feed direction;
calculating a composite motion by superposing a basic movement in the feed direction at the feed speed and an oscillation determined based on the tool data, the number of rotations, and the oscillation condition; and
causing the rotary multi-edge tool to perform a relative movement with respect to the workpiece, the relative movement being coincident with the composite motion,
wherein the oscillation causes the rotary multi-edge tool to oscillate in the feed direction and a direction orthogonal to the feed direction,
a number of the cutting edges that pass through an identical rotation position in one cycle of the oscillation is defined as N, and
the method maintains a peak of protrusion of the rotary multi-edge tool in a rotation axis direction at a maximum value for a period equal to or longer than 1/N of the one cycle during the oscillation.

3. A numerical control device for controlling a machine tool based on a machining program, the machine tool being configured to machine a workpiece using a rotary multi-edge tool having a plurality of cutting edges, the numerical control device comprising:
a processor configured to control the numerical control device to:
acquire tool data including a number of the cutting edges of the rotary multi-edge tool;
acquire machining information including a feed direction, a feed speed, and a number of rotations for the rotary multi-edge tool to move with respect to the workpiece in accordance with the machining program;
acquire an oscillation condition for the rotary multi-edge tool to oscillate in at least one of the feed direction or a direction orthogonal to the feed direction;
calculate a movement command for the rotary multi-edge tool to perform a relative movement with respect to the workpiece, the relative movement being coincident with a composite motion resulting from superposition of a basic movement in the feed direction at the feed speed and an oscillation determined based on the tool data, the number of rotations, and the oscillation condition; and control the multi-edge tool to perform the relative movement coincident with the composite motion based on the movement command to machine the workpiece, wherein the oscillation causes the rotary multi-edge tool to oscillate in the feed direction and a direction orthogonal to the feed direction, and the processor is configured to determine the oscillation such that a protrusion amount of the rotary multi-edge tool in a rotation axis direction is maximized at a position where a retraction amount of the rotary multi-edge tool in the feed direction reaches a maximum.

4. A numerical control device for controlling a machine tool based on a machining program, the machine tool being configured to machine a workpiece using a rotary multi-edge tool having a plurality of cutting edges, the numerical control device comprising:

a processor configured to control the numerical control device to:

acquire tool data including a number of the cutting edges of the rotary multi-edge tool;

acquire machining information including a feed direction, a feed speed, and a number of rotations for the rotary multi-edge tool to move with respect to the workpiece in accordance with the machining program;

acquire an oscillation condition for the rotary multi-edge tool to oscillate in at least one of the feed direction or a direction orthogonal to the feed direction;

calculate a movement command for the rotary multi-edge tool to perform a relative movement with respect to the workpiece, the relative movement being coincident with a composite motion resulting from superposition of a basic movement in the feed direction at the feed speed and an oscillation determined based on the tool data, the number of rotations, and the oscillation condition; and control the multi-edge tool to perform the relative movement coincident with the composite motion based on the movement command to machine the workpiece, wherein the processor is configured to check a rotation position of the rotary multi-edge tool, and determine the oscillation such that a specific one of the cutting edges is positioned at a forwardmost point in the feed direction at a predetermined phase of the oscillation.

5. The numerical control device according to claim 4, wherein the processor is configured to select, from the cutting edges, one cutting edge that is positioned at the forwardmost point in the feed direction at a predetermined phase of the oscillation.

6. A method for machining a workpiece using a rotary multi-edge tool having a plurality of cutting edges, the method comprising:

acquiring tool data regarding the rotary multi-edge tool;

acquiring machining information including a feed direction, a feed speed, and a number of rotations for the rotary multi-edge tool to move with respect to the workpiece;

acquiring an oscillation condition for the rotary multi-edge tool to oscillate in at least one of the feed direction or a direction orthogonal to the feed direction;

calculating a composite motion by superposing a basic movement in the feed direction at the feed speed and an oscillation determined based on the tool data, the number of rotations, and the oscillation condition; and causing the rotary multi-edge tool to perform a relative movement with respect to the workpiece, the relative movement being coincident with the composite motion, wherein the oscillation causes the rotary multi-edge tool to oscillate in the feed direction and a direction orthogonal to the feed direction, and the method includes determining the oscillation such that a protrusion amount of the rotary multi-edge tool in a rotation axis direction is maximized at a position where a retraction amount of the rotary multi-edge tool in the feed direction reaches a maximum.

7. A method for machining a workpiece using a rotary multi-edge tool having a plurality of cutting edges, the method comprising:

acquiring tool data regarding the rotary multi-edge tool;

acquiring machining information including a feed direction, a feed speed, and a number of rotations for the rotary multi-edge tool to move with respect to the workpiece;

acquiring an oscillation condition for the rotary multi-edge tool to oscillate in at least one of the feed direction or a direction orthogonal to the feed direction;

calculating a composite motion by superposing a basic movement in the feed direction at the feed speed and an oscillation determined based on the tool data, the number of rotations, and the oscillation condition;

causing the rotary multi-edge tool to perform a relative movement with respect to the workpiece, the relative movement being coincident with the composite motion;

checking a rotation position of the rotary multi-edge tool; and determining the oscillation such that a specific one of the cutting edges is positioned at a forwardmost point in the feed direction at a predetermined phase of the oscillation.

* * * * *